United States Patent [19]

Michelotti et al.

[11] 4,308,319

[45] Dec. 29, 1981

[54] PYROLYTIC DEPOSITION OF A COBALT/TIN OXIDE SPINEL FILM

[75] Inventors: Joseph E. Michelotti; Stanley M. Ohlberg, both of Pittsburgh, Pa.

[73] Assignee: PPG Industries, Inc., Pittsburgh, Pa.

[21] Appl. No.: 157,908

[22] Filed: Jun. 9, 1980

Related U.S. Application Data

[63] Continuation-in-part of Ser. No. 90,172, Nov. 1, 1979, abandoned, which is a continuation of Ser. No. 921,686, Jul. 3, 1978, abandoned.

[51] Int. Cl.³ .................... B32B 17/06; B05D 1/02
[52] U.S. Cl. .................... 428/432; 428/701; 427/168; 427/314; 427/427
[58] Field of Search .................... 428/433, 432, 701; 427/168, 314, 427

[56] References Cited

U.S. PATENT DOCUMENTS

| | | | |
|---|---|---|---|
| 2,564,706 | 8/1951 | Mochel | 428/432 |
| 2,617,742 | 11/1952 | Olson | 428/432 |
| 2,688,565 | 9/1954 | Raymond | 428/432 |
| 3,185,586 | 5/1965 | Saunders | 428/432 |
| 3,202,054 | 8/1965 | Mochel | 427/168 |
| 3,244,547 | 4/1966 | Orr | 428/432 |
| 3,352,707 | 11/1967 | Picard | 428/432 |
| 3,410,710 | 11/1968 | Mochel | 427/168 |
| 3,411,934 | 11/1968 | Englehart | 427/168 |
| 3,455,722 | 7/1969 | Kushihashi | 428/432 |
| 3,514,175 | 5/1970 | Jenkins | 427/168 |
| 3,660,061 | 5/1972 | Donley | 428/432 |
| 3,671,291 | 6/1972 | Miller | 427/168 |
| 3,850,665 | 11/1974 | Plumat | 427/168 |
| 3,949,259 | 4/1976 | Kostlin | 427/168 |
| 3,978,272 | 8/1976 | Donley | 428/434 |
| 3,984,591 | 10/1976 | Plumat | 427/168 |

*Primary Examiner*—Ellis P. Robinson
*Attorney, Agent, or Firm*—Donna L. Seidel

[57] ABSTRACT

Pyrolytic deposition of a durable, uniform, electrically nonconductive solar energy reflecting spinel-type film from an aqueous solution of a water soluble cobalt salt and a water soluble tin compound is disclosed.

8 Claims, No Drawings

PYROLYTIC DEPOSITION OF A COBALT/TIN OXIDE SPINEL FILM

CROSS REFERENCE TO RELATED APPLICATIONS

This is a continuation-in-part of application Ser. No. 90,172 filed Nov. 1, 1979 now abandoned, which is a continuation of application Ser. No. 921,686 filed July 3, 1978, now abandoned.

BACKGROUND OF THE INVENTION

1. Field of the Invention

The present invention relates generally to the art of pyrolytic deposition of metal oxide films, and more particularly to the pyrolytic deposition of metal oxide films from aqueous solutions of coating reactants.

2. The Prior Art

The pyrolytic deposition of metal oxides onto a glass surface is described in U.S. Pat. No. 3,660,061 to Donley et al. Organometallic salts, preferably acetylacetonates, are dissolved in an organic vehicle such as methylene chloride. Other suitable solvents include aliphatic and olefinic halocarbons, halogenated hydrocarbons, alcohols, and nonpolar aromatic compounds such as benzene and toluene. The organic solution is sprayed onto a hot glass surface where it thermally decomposes to form a metal oxide film which changes the reflectance and transmittance of solar energy by the glass.

In U.S. Pat. No. 3,441,934, Englehart et al disclose that cobalt oxide is particularly suited for use as a coating on glass because of its good solar heat shielding properties. However, cobalt oxide coatings are not as uniform and adherent as desired. Englehart et al teach that the adherence, durability and optical quality of cobalt oxide films are improved by providing the glass surface with a thin tin oxide undercoating, and then overcoating with cobalt oxide by thermal pyrolysis of a cobalt compound such as cobalt acetylacetonate. Preferably, the cobalt oxide coating also contains the oxides of iron and chromium since these oxides improve the scratch resistance of the coating without detracting from the solar heat shielding properties of the cobalt oxide. A preferred solvent system for the metal coating reactants comprises a polar organic compound and a nonpolar aromatic compound, particularly methanol combined with either benzene or toluene.

Current interest in eliminating the health and environmental hazards of using large volumes of organic solvents has encouraged the development of aqueous coating compositions. It is known from U.S. Pat. No. 2,688,565 to Raymond that light reflecting coatings of cobalt oxide may be deposited by contacting a hot glass surface with an aqueous solution of cobalt acetate. However, such films have a grainy, irregular texture and are highly porous, resulting in poor acid resistance evidenced by debonding of the film.

SUMMARY OF THE INVENTION

The present invention involves the pyrolytic deposition of an electrically nonconductive spinel-type film containing cobalt and tin oxides by thermal decomposition of an aqueous solution of a water soluble cobalt salt and a water soluble tin compound. The resultant film is more uniform in appearance and less porous than a cobalt oxide film which does not contain tin oxide. The cobalt/tin oxide film is also more durable, as evidenced by the fact that it withstands immersion in 0.5 percent hydrofluoric acid solution for 8 minutes with no film debonding while a cobalt oxide film fails this durability test.

The cobalt and tin coating reactants are dissolved in water. The aqueous solution is then applied to a glass surface at a sufficiently high temperature to pyrolyze the coating reactants to form a metal oxide film.

DESCRIPTION OF THE PREFERRED EMBODIMENTS

Aqueous solutions of a water soluble cobalt salt, preferably cobalt acetate, and a water soluble tin compound, preferably dimethyltin dichloride, are prepared with wide variation in the ratio of cobalt to tin. The ratio of cobalt to tin is preferably about 2:1 to 20:1 by weight and more preferably about 5:1 to 12:1. The total metal concentration in the solution preferably ranges from about 1 to 12 percent by weight and more preferably from about 5 to 6 percent.

Preferred cobalt salts include cobalt nitrate and cobalt perchlorate as well as cobalt acetate. Preferred water soluble tin compounds include tin chlorides such as $SnCl_2$ and $SnCl_4$, and other alkytin chlorides such as methyltin trichloride, trimethyltin chloride, diethyltin dichloride, diisopropyltin dichloride, stannic bisacetylacetone dichloride and stannic acetate.

The aqueous solution of cobalt and tin coating reactants is applied to a surface of a glass substrate which is maintained at a temperature sufficient to pyrolyze the coating reactants to form an oxide film, preferably at least about 500° F. (about 260° C.) and more preferably about 1000°–1200° F. (about 538° to 650° C.).

In a particularly preferred embodiment of the present invention, a stock solution of cobalt acetate containing 5.0 percent by weight cobalt is prepared by dissolving the cobalt acetate in water, preferably including about 5 percent by weight glacial acetic acid to provide long shelf life. The selected hydrolyzable tin compound is separately dissolved in water. Coating solutions having a variety of cobalt/tin ratios are prepared by mixing the two solutions in various proportions.

A particularly preferred method for applying the above solution to a hot glass surface is to spray the aqueous solution onto the surface of a continuous glass ribbon formed on a bath of molten metal in a refractory tank after the ribbon has been lifted from the bath and conveyed beyond the reducing atmosphere which protects the bath. A detailed description of a preferred method for the pyrolytic deposition of metal oxide films on glass is found in U.S. Pat. No. 3,660,061, commonly assigned, which description is incorporated herein by reference.

In accordance with the present invention, an electrically nonconductive film is formed comprising a cobalt/tin oxide spinel wherein cobalt is the predominant metal. A typical spinel composition is $AB_2O_4$ wherein A is a metal having a valence of four and B is a metal having a valence of two, in the present invention tin and cobalt respectively. In a typical spinel structure, the oxygen atoms attain an approximate face-centered cubic orientation with each oxygen atom surrounded by four metal atoms in a distorted tetrahedron. Because the oxygen atoms may be somewhat displaced either toward the tetrahedral sites or in the reverse direction of the body diagonal, the different metal atoms may occupy alternate sites although they must satisfy a relative size relationship in order to form the crystal structure of a spinel. Thus the formula $AB_2O_4$ does not define the exact position of the metal atoms or an exact ratio. In the cobalt/tin oxide spinel of the present invention, it is believed that cobalt fills the tetrahedral positions as well as some of the octahedral positions, a structure referred to as an inverse spinel.

The present invention will be further understood from the descriptions of specific examples which follow. The spectral properties of glass coated according to these examples are shown in Table I.

EXAMPLE I

A stock cobalt acetate solution is prepared by combining 21.13 percent by weight cobalt acetate tetrahydrate, $Co(C_2H_3O_2)_2.4H_2O$, 5.25 percent by weight glacial acetate acid, and 73.62 percent by weight water. This stock cobalt solution contains 5.0 percent by weight cobalt. A stock tin solution is prepared by dissolving 23.13 percent by weight dimethyltin dichloride, $(CH_3)_2SnCl_2$, in 76.87 percent by weight water. This stock tin solution contains 12.5 percent by weight tin.

A coating solution for depositing a cobalt/tin oxide spinel-type film is prepared by combining 100 parts by volume of the stock cobalt solution with 11.08 parts by volume of the stock tin solution. The ratio of cobalt to tin is 3.5 to 1.0 and the total metal concentration is 5.85 percent by weight. The coating solution is sprayed onto a glass surface at a temperature of 1050° to 1070° F. (about 566° to 577° C.). The coating reactants pyrolyze to form a durable, uniform cobalt/tin oxide spinel-type film on the glass surface.

EXAMPLES II THROUGH VIII

| Example | Cobalt Solution (parts by volume) | Tin Solution (parts by volume) | Metal Concentration (percent by weight) | Cobalt/Tin (weight ratio) |
|---|---|---|---|---|
| II | 100 | 7.75 | 5.59 | 5.0/1.0 |
| III | 100 | 5.96 | 5.44 | 6.5/1.0 |
| IV | 100 | 5.17 | 5.38 | 7.5/1.0 |
| V | 100 | 4.56 | 5.34 | 8.5/1.0 |
| VI | 100 | 4.08 | 5.31 | 9.5/1.0 |
| VII | 100 | 3.88 | 5.29 | 10.0/1.0 |
| VIII | 100 | 3.52 | 5.26 | 11.0/1.0 |

Glass articles prepared according to the method of this invention have the following properties with respect to Illuminant C: luminous transmittance—30 to 50 percent, dominant wavelength of transmitted light 575 to 580 nanometers, excitation purity of transmitted light—10 to 25 percent; from the coated surface: luminous reflectance—25 to 40 percent, dominant wavelength of reflected light—555 to 575 nanometers, excitation purity of reflected light—4 to 12 percent; from the uncoated surface: luminous reflectance 20 to 30 percent, dominant wavelength of reflected light—550 to 570 nanometers, and excitation purity of reflected light—4 to 12 percent.

The above examples are offered to illustrate the present invention. Various modifications apparent to ones skilled in the art are included within the scope of the present invention. Other water soluble metal compounds may be employed as well as ratios and concentrations of metals outside the range of the specific examples. Cobalt/tin oxide spinel-type coatings may be deposited in conjunction with other films and on a variety of substrates other than glass, particularly nonmetallic substrates such as ceramics and other refractory materials. The scope of the present invention is defined by the following claims.

We claim:

1. A method for depositing an electrically nonconductive spinel-type film comprising the oxides of cobalt and tin on a glass substrate comprising the steps of:
   a. maintaining a substrate in an oxidizing atmosphere at a temperature sufficient to pyrolyze metal compounds to metal oxides;
   b. contacting the surface of the substrate at said temperature with an aqueous solution consisting essentially of water, a water soluble cobalt salt and a water soluble tin compound capable of thermal decomposition to cobalt oxide and tin oxide; and
   c. thermally reacting said cobalt salt and said tin compound in said oxidizing atmosphere to form an electrically nonconductive film comprising a cobalt/tin oxide spinel wherein cobalt is the predominant metal in the film.

2. The method according to claim 1 wherein the solution comprises a tin compound selected from the group consisting of tin chlorides and alkyltin chlorides and a cobalt salt selected from the group consisting of cobalt acetate, cobalt nitrate and cobalt perchlorate.

3. The method according to claim 2 wherein the solution comprises dimethyltin dichloride and cobalt acetate.

4. The method according to claim 3 wherein the ratio of cobalt to tin is from 5:1 to 12:1 and the total concentration of metal in the solution ranges from 5 to 6 percent.

5. The method according to claim 3 wherein the substrate is a nonmetallic refractory material.

6. A coated glass article comprising an electrically nonconducting film comprising a cobalt/tin oxide spinel wherein the cobalt is the predominant metal in said film prepared by contacting a glass surface at a temperature greater than 500° F. (about 260° C.) with an aqueous

TABLE I

| | Spectral Properties (Illuminant C) of Cobalt/Tin Oxide Spinel-Type Films | | | | | | | | |
|---|---|---|---|---|---|---|---|---|---|
| | Transmittance | | | Reflectance (Coated Surface) | | | Reflectance (Uncoated Surface) | | |
| Example | Luminous (percent) | Dominant Wavelength (nanometers) | Excitation Purity (percent) | Luminous (percent) | Dominant Wavelength (nanometers) | Excitation Purity (percent) | Dominant Luminous (percent) | Excitation Wavelength (nanometers) | Purity (percent) |
| I | 45.2 | 577.0 | 12.6 | 29.6 | 568.4 | 7.0 | 24.3 | 546.4 | 7.8 |
| II | 41.1 | 577.6 | 14.9 | 31.5 | 567.6 | 7.5 | 25.8 | 563.0 | 7.8 |
| III | 35.8 | 577.5 | 19.3 | 33.2 | 569.7 | 9.7 | 26.8 | 565.9 | 9.7 |
| IV | 38.6 | 578.7 | 17.2 | 33.5 | 557.2 | 4.5 | 26.3 | 552.7 | 5.3 |
| V | 36.0 | 577.5 | 20.0 | 33.9 | 567.7 | 8.7 | 27.0 | 564.5 | 9.8 |
| VI | 33.5 | 578.0 | 20.9 | 34.9 | 568.1 | 8.7 | 28.0 | 564.3 | 9.4 |
| VII | 32.6 | 577.6 | 21.5 | 35.0 | 570.0 | 10.3 | 28.4 | 566.2 | 10.4 |
| VIII | 32.4 | 578.0 | 21.2 | 35.7 | 567.8 | 8.6 | 28.6 | 563.3 | 8.9 | solution consisting essentially of water, a water soluble cobalt salt and a water soluble tin compound.

7. A glass article according to claim 6 wherein the glass surface is contacted at a temperature of about 1000° to 1200° F. (about 538° to 650° C.) with an aqueous solution of a cobalt salt selected from the group consisting of cobalt acetate, cobalt nitrate and cobalt perchlorate and a tin compound selected from the group consisting of tin chlorides and alkyltin chlorides wherein the ratio of cobalt to tin in the solution is from 5:1 to 12:1 and the total metal concentration in the solution is from 5 to 6 percent.

8. A glass article according to claim 7 which has the following properties with respect to Illuminant C: luminous transmittance—30 to 50 percent, dominant wavelength of transmitted light 575 to 580 nanometers, excitation purity of transmitted light—10 to 25 percent; from the coated surface: luminous reflectance—25 to 40 percent, dominant wavelength of reflected light—555 to 575 nanometers, excitation purity of reflected light—4 to 12 percent; from the uncoated surface: luminous reflectance 20 to 30 percent, dominant wavelength of reflected light—550 to 570 nanometers, and excitation purity of reflected light—4 to 12 percent.

* * * * *